No. 749,367. PATENTED JAN. 12, 1904.
E. R. DRAVER.
SELF CONTAINED GRAIN SCOURER AND DUST COLLECTOR.
APPLICATION FILED JULY 15, 1903.
NO MODEL.
3 SHEETS—SHEET 1.

Witnesses
A. H. Opsahl
N. S. Kilgore

Inventor.
E. R. Draver
By his Attorneys.
Williamson & Merchant

No. 749,367. PATENTED JAN. 12, 1904.
E. R. DRAVER.
SELF CONTAINED GRAIN SCOURER AND DUST COLLECTOR.
APPLICATION FILED JULY 15, 1903.
NO MODEL. 3 SHEETS—SHEET 2.

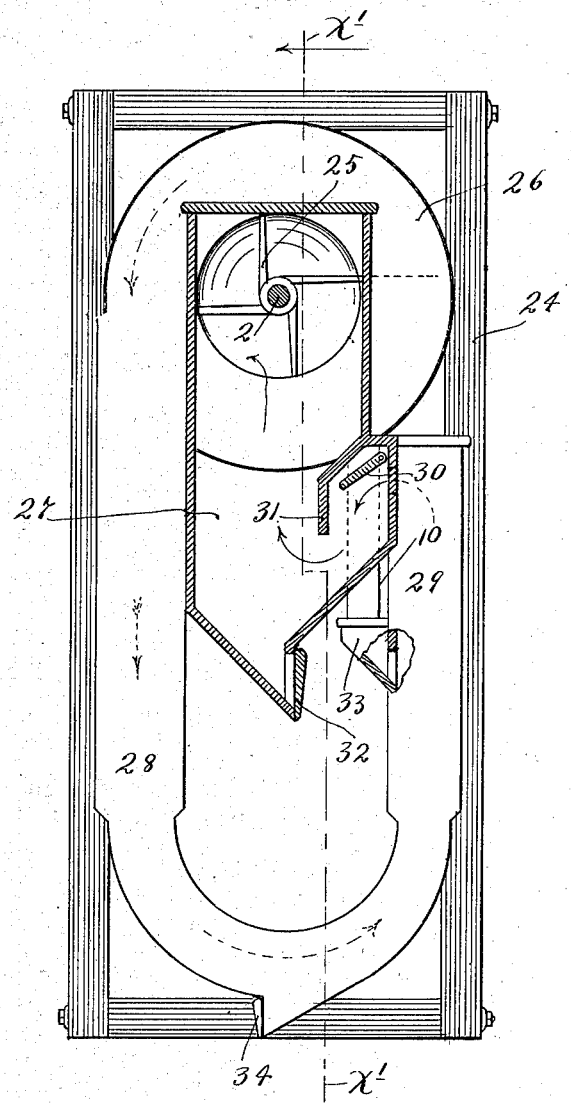

No. 749,367.

Patented January 12, 1904.

UNITED STATES PATENT OFFICE.

EMIL R. DRAVER, OF RICHMOND, INDIANA.

SELF-CONTAINED GRAIN-SCOURER AND DUST-COLLECTOR.

SPECIFICATION forming part of Letters Patent No. 749,367, dated January 12, 1904.

Application filed July 15, 1903. Serial No. 165,616. (No model.)

*To all whom it may concern:*

Be it known that I, EMIL R. DRAVER, a citizen of the United States, residing at Richmond, in the county of Wayne and State of Indiana, have invented certain new and useful Improvements in Self-Contained Grain-Scourers and Dust-Collectors; and I do hereby declare the following to be a full, clear, and exact description of the invention, such as will enable others skilled in the art to which it appertains to make and use the same.

My invention has for its primary purpose to provide a self-contained grain-scourer and dust-collector, and I also combine with said grain-scourer and dust-collector an air-belt grain-separator for coöperation therewith to separate the stock delivered from the scourer to said separator.

To the ends above noted my invention consists of the novel devices and combinations of devices hereinafter described, and pointed out in the claims.

The invention is illustrated in the accompanying drawings, wherein like notations refer to like parts throughout the several views.

Figure 1:
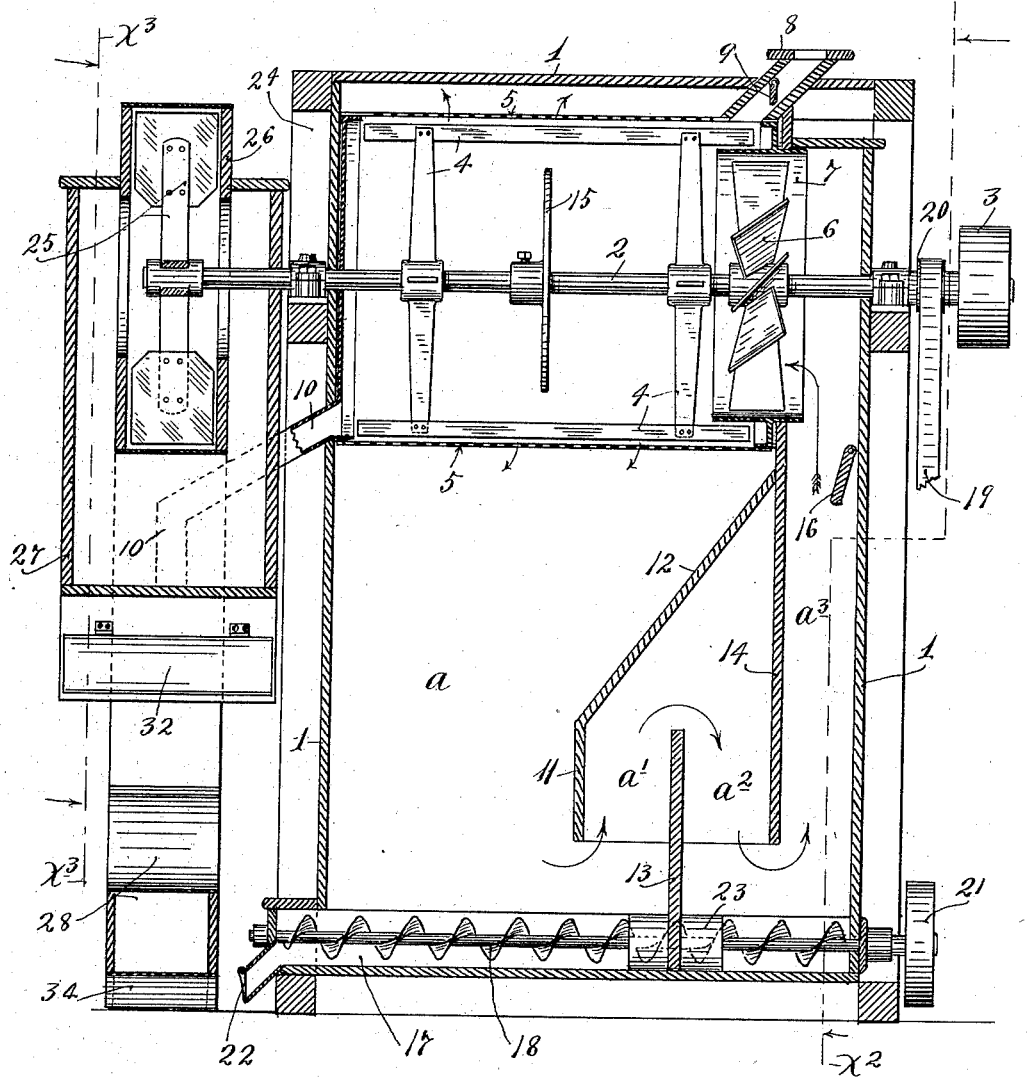
Figure 2:
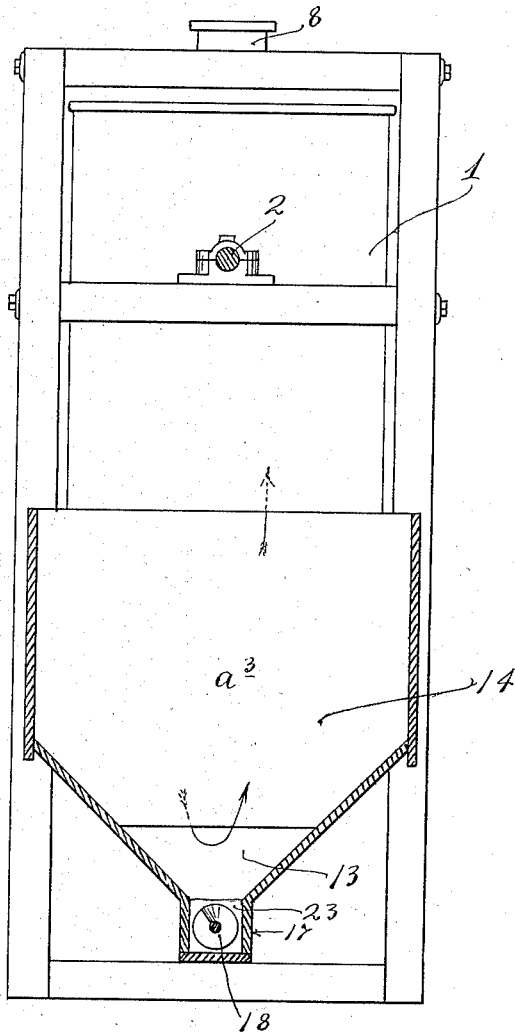

In said drawings, Figure 1 is a vertical central section through the entire machine on the line $x'$ $x'$ of Fig. 3. Fig. 2 is a vertical cross-section on the line $x^2$ $x^2$ of Fig. 1, the same being a section on an irregular line; and Fig. 3 is a vertical cross-section through the air-belt separator on the line $x^3$ $x^3$ of Fig. 1.

The numeral 1 represents a suitable closed casing, within which are mounted the parts coöperating therewith to afford the self-contained grain-scourer and dust-collector.

The numeral 2 represents a shaft suitably journaled on the framework of the casing 1 and provided on its right-hand projecting end with the pulley 3, through which the same receives motion from a belt. (Not shown.) Said shaft 2 is provided with beater-blades 4, which coöperate with the perforated drum 5 in the scouring action, and said shaft 2 is also provided with a propeller-fan 6, which coöperates with the fan-case 7 to maintain a forced circulation of air throughout the machine. A feed-hopper 8 taps the head of the drum 5 directly over the fan-casing 7 and is provided with a controlling-valve 9 for supplying the grain to the head of the scourer. The drum 5 is provided also with a valve-controlled outlet 10, through which the scoured stock passes from the grain-scourer.

Suitable partition-plates 11, 12, 13, and 14 coöperate with the walls of the casing 1 and with each other to divide the interior of the casing into air-trunk sections marked, respectively, $a$ $a'$ $a^2$ $a^3$. Of the said partitions the members 11 and 14 are connected by the inclined member 12 and stop short of the bottom of the casing, being spaced apart therefrom for a considerable distance to allow the air to pass thereunder from one section of the air-trunk to another. The partition-plate 13 rises from the bottom of the casing and extends upward between the partition-plates 11 and 14, but stops short of the inclined plate 12, thus affording a free passage to the air over the top of the partition 13 from the air-trunk section $a'$ into the trunk-section $a^2$. The main partition 14 extends to the top of the casing and is cut away to receive one flange of the fan-casing 7, thereby assisting in the support of said fan-casing 7 and the drum 5, which is fixed at one end to the main rib of said casing 7. The other end of the drum 5 is made fast to the opposite wall of the casing 1. The casing 7 is open at both ends, receiving the air from the updraft-section $a^3$ of the air-trunk and delivering the same under the action of the fan 6 into the head end of the scourer. The shaft 2 is shown as provided with a deflecting-plate 15 of less diameter than the beater 4 for spreading the body of air delivered into the drum under the action of the fan 6 outward toward the walls of the drum 5. The updraft-section $a^3$ of the air-trunk is provided with a controlling-valve 16. The bottom of the casing 1 is of hopper form and terminates in a screw conveyer-trough 17, equipped with the screw conveyer 18, which receives motion from the main shaft 2 by a belt 19, running over the small pulley 20 on the shaft 2 and the larger pulley 21 on the right-hand projecting end of conveyer 18. The conveyer-trough 17 has a valved outlet 22, through which the collected dust is forced out by the conveyer 18.

The parts so far specified constitute a self-contained grain-scourer and dust-collector. The action, briefly summarized, is as follows: The stock having been admitted through the feed-chute 8 to the head of the scouring-drum 5 becomes subject to the coöperation of the beater 4 and the drum 5 under the forced blast of air delivered into the drum 5 by the propeller-fan 6. Under this scouring action the dust, dirt, smut, germ-tips, and fuzz will be scoured off from the grain and be carried through the perforated drum 5 with the air-blast into the comparatively large air-trunk section or expansion-chamber $a$, which directly underlies the scouring-drum 5. The partition-plates 11, 12, 13, and 14 being disposed relative to each other, as above described, constitute a series of baffle-plates which cause the moving body or belt of air to successively change the direction of its movement in its passage from one section of the air-trunk to the other. The chamber $a$ being relatively large as compared with other sections of the air-trunk and the area of the scouring-drum, all the heavy particles which are forced through the perforations of the drum into the chamber $a$ with the moving body of air will be precipitated directly within the chamber $a$ to the bottom of the casing and into the conveyer-trough 17. The partly-purified air will then move onward into the trunk-sections $a'$ and $a^2$ and thence into the updraft-section $a^3$ and by the successive changes there caused in the direction of the air's travel by its impingement against the plates 11, 12, 13, and 14 the remaining particles of dust will under the action of gravity be precipitated and also fall to the bottom of the casing and into the trough 17. Hence by the time the moving body of air reaches the receiving side of the fan in the updraft-section $a^3$ the air will have been purified and again ready for reuse in the grain-scourer. In this way the air is used over and over again, successively doing its work in the scourer and being relieved from its load in the dust-collector and again entering the fan in purified form.

The partition 13 is of course cut to fit the hopper-like bottom of the casing 1, and in order to prevent the air from being drawn through the conveyer-trough under the partition 13 the conveyer 18 is fitted with a sleeve 23, which extends sufficiently far on opposite sides of the partition 13 and makes a sufficiently close fit with the blade of the screw conveyer to prevent any material portion of the air passing under the said partition 13.

The dust and foreign materials collected in the trough 17 are discharged by the conveyer 18 through the valved outlet 22. The scoured stock is delivered from the scouring-drum 5 through the valved outlet-spout 10 into the air-belt separator, the parts of which will now be noted so far as deemed necessary or desirable for the purpose of this case. This air-belt separator is substantially of the same general construction as that disclosed in my pending application, Serial No. 162,967, filed June 25, 1903, (Case B,) entitled "Grain cleaner and separator," and coöperates with the scourer herein disclosed, substantially in the same way as in my said pending case. A suitable skeleton frame 24 is provided with the fan-casing 26, adapted to receive the projecting end of the scourer-shaft 2 and provided with the fan 25 for maintaining the air circulation in the air-belt separator. The air-trunk head 27 embraces the fan-casing 26 to a point above the eyes of the fan for delivering the purified air thereto and is of proper shape to afford an expansion-chamber with a hopper-like bottom directly below the fan-casing. The air from the fan 25 is delivered to the downdraft-section 28 of the air-trunk and thence to the updraft-section 29 of said air-trunk, and from the latter into the trunk-head or expansion-chamber 27. The air is admitted from the updraft-section 29 to the lower or hopper end of the trunk-head 27 through a valve-controlled passage 30 and against a deflecting or baffle plate 31. The hopper-bottom of the trunk-head 27 is provided with a valve-controlled outlet 32. The scoured stock delivered from the scourer through the spout 10 is received by the grain-belt separator through a small hopper 33, tapping the updraft-section 29 of the air-trunk. The two trunk-sections 28 and 29 have their outer walls offset from each other at their lowermost point to afford a valve-controlled outlet 34. Having regard to the action of the separator, it is obvious that the stock admitted into the trunk-section 29 there becomes subject to the updraft or blast of air from the fan 25. The high-grade or heavy grain will drop directly downward through the trunk-section 29 and pass out through the valved outlet 34, but the light-weight grain, broken grain, cockle, and other screenings or foreign materials will be carried upward with the blast of air and be delivered into the expansion-chamber afforded by the trunk-head 27. This expansion-chamber is relatively large as compared with the cross-sections of the trunk-legs 28 and 29, and the air is made to successively change direction in passing therethrough, and hence all the screenings or foreign materials carried up with the moving body of air into the lower or hopper-shaped section of the trunk-head 27 will be precipitated therein and will pass outward through the valved discharge 32. The air thus being freed from its load will pass on upward through the trunk-head 27 and into the eyes of the fan. The circulation will thus be constantly maintained for doing the work required.

As compared with my prior pending case, above identified, the air-belt separator herein disclosed differs therefrom chiefly in the size of the trunk-head or expansion-chamber 27 as compared with the cross-section of the trunk-legs 28 and 29. It is desirable to have this expansion-chamber, as herein disclosed, for securing the most efficient separating action.

It is of course obvious that a machine organized as herein disclosed is simple and cheap in construction, is compact in form, and is self-contained.

The combined scourer and dust-collector takes care of all the dust, dirt, smut, fuzz, sprout-tips, or other foreign materials which can be scoured off from the stock and purifies the air which passes through the scourer without the delivery of any dust-laden air into the atmosphere of the room or to the grain-belt separator. The grain-belt separator therefore does not have to take care of any of the dust and may be comparatively simple in form and effect the desired separation with the use of a comparatively small fan requiring a correspondingly small amount of power to drive the same. These features of the machine herein disclosed adapt the same for extensive use in many places where it would not be feasible to deliver the dust-laden air to the atmosphere or to lead the same off to a separate dust-collector. The economy of power, cheapness of first cost, and durability in service are also important features of advantage.

From the foregoing description it will be seen that the complete apparatus involves two endless-trunk separators, each having its own fan for keeping up independent circulations of endless belts of air. For the sake of definiteness one of these endless air-trunks may be treated as the primary endless air-trunk and the other as the secondary endless air-trunk. The perforated scouring-drum 5, as has already been described, is interposed in the primary endless air-trunk, so that the dust-laden air is delivered over and over again through the scouring-drum and from thence to the settling-chamber of the said air-trunk. Under this action the air-belt in the primary air-trunk is caused to continuously take up the scourings and light material from the grain, carrying it from thence to and depositing it in the settling-chamber and thence returning practically free from dust to perform over again the actions of taking up and depositing the dust and other particles, as just described.

By actual usage I have demonstrated the efficiency of this machine herein disclosed for the purposes had in view.

It will be understood that modifications could be made in the construction without departing from the spirit of the invention.

What I claim, and desire to secure by Letters Patent of the United States, is as follows:

1. The combination with a primary endless air-trunk separator, in which the light particles are removed from the stock and a scourer interposed in said primary air-trunk, of a secondary endless-air-trunk separator receiving the partially-purified stock from said primary air-trunk separator, and in which secondary air-trunk separator the heavier particles are separated from the stock, substantially as described.

2. An endless air-trunk having a settling-chamber, a perforate scouring-drum interposed in said air-trunk, an agitator working within said scouring-drum, and a fan in said air-trunk, operating to force the dust-laden air through said scouring-drum and to said settling-chamber, over and over again, in combination with a secondary endless air-trunk having a settling-chamber and a fan, and in which the heavier particles are separated from the stock, substantially as described.

3. A combined grain-scourer and dust-collector comprising primary and secondary endless air-trunks, a perforate scouring-drum interposed in said primary endless air-trunk, a common shaft, carrying an agitator and two fans, said agitator working in said scouring-drum and the said fans working one in each of said endless air-trunks and producing independent endless belts of air, and means for delivering the partially-purified stock from said scouring-drum into said secondary endless air-trunk, substantially as described.

4. The combination with a primary endless-air-trunk separator, in which the light particles are removed from the stock and a scourer interposed in said primary air-trunk, of a secondary endless-air-trunk separator receiving the partially-purified stock from said primary separator and in which secondary air-trunk separator the heavier particles are separated from the stock, and means for independently regulating the blasts of air through the said two endless-air-trunk separators, substantially as described.

5. The combination with an endless air-trunk having therein a dust collecting or settling chamber, of a grain-scourer made up of a perforated scouring-shell, a rotary beater mounted within the shell and coöperating therewith, and a propeller-fan located at the receiving end of said scourer and receiving the belt of air from the clean-air side of said collecting and settling chamber, and forcing the whole thereof through the perforated shell of said scourer, along with the dust removed from the grain under the scouring action, into said dust collecting and settling chamber, said fan thus serving to maintain a continuous circulation of the belt of air through the said scourer and said collecting and settling chamber in an endless closed circuit, substantially as and for the purposes set forth.

6. The combination with a substantially air-tight casing, of a grain-scourer made up of a perforated shell located near the top of said casing, a rotary beater mounted therein for coöperation with said shell, and a propeller-fan located at the receiving end of said scourer, a dust collecting or settling chamber located beneath the scouring-drum and having deflecting or baffle plates for making the air pursue a tortuous path in passing through said chamber, and a clean-air leg or section of the air-trunk leading from the clean-air side of said settling-chamber to the open head end of the scouring-drum, said parts being so disposed as to afford an endless air-trunk through which said fan maintains a continuous circulation of a belt of air, forcing the clean air into the scouring-drum, and the dust-laden air into the settling-chamber, a partition-plate in said settling-chamber dividing the same into dust-laden and clean-air sides of compartments, and a conveyer-equipped trough in the bottom of said casing forcing out the collected dust, which conveyer works through the said partition and is provided with a dust-tight joint, all of which parts above named cooperate substantially as and for the purposes set forth.

In testimony whereof I affix my signature in presence of two witnesses.

EMIL R. DRAVER.

Witnesses:
  WILFRED JESSUP,
  FLORENCE N. DRAVER.